United States Patent
Maeger et al.

(10) Patent No.: US 6,187,423 B1
(45) Date of Patent: Feb. 13, 2001

(54) PEROXIDE MODIFIED HEXENE GAS PHASE COPOLYMER LINEAR LOW DENSITY POLYETHYLENE IN GEOMEMBRANE APPLICATIONS

(75) Inventors: Pamela L. Maeger; Terry R. King, both of Orange, TX (US)

(73) Assignee: Chevron Phillips Chemical Company LC, San Francisco, CA (US)

( * ) Notice: Under 35 U.S.C. 154(b), the term of this patent shall be extended for 0 days.

(21) Appl. No.: 08/997,070

(22) Filed: Dec. 23, 1997

(51) Int. Cl.$^7$ ........................................................ B32B 7/02
(52) U.S. Cl. ........................ 428/220; 428/172; 428/213; 428/409
(58) Field of Search ............................. 526/57; 525/193, 525/240, 330.8; 428/220, 156, 172, 213, 409

(56) References Cited

FOREIGN PATENT DOCUMENTS 96-311821 * 11/1996 (JP) .

OTHER PUBLICATIONS

Reference A: "Plastic Fabrication and Uses" ISSN, 0104–1428, 1996.*

Reference B: "Reactive Processing of LLPDEs in Counter-rotating Nonintermeshing Twin–Srew Extruder", 1996.*

Reference D: "Effects of Molecular Structure of LLDPEs", 1996.*

* cited by examiner

Primary Examiner—Merrick Dixon
(74) Attorney, Agent, or Firm—W. B. Haymond; J. W. Ambrosius; W. K. Turner

(57) ABSTRACT

A peroxide treated LLPDE material that can used as a geomembrane liner in land areas storing toxic waste, municipal landfills, leachate or slurry ponds, and other such land containment applications as well as applications in which a strong, non-biodegradable material which is impermeable to air and moisture is needed.

5 Claims, 5 Drawing Sheets

PEROXIDE MODIFIED HEXENE GAS PHASE COPOLYMER LINEAR LOW DENSITY POLYETHYLENE IN GEOMEMBRANE APPLICATIONS

FIELD OF THE INVENTION

The invention relates to a linear low density polyethylene material that can be formed into thick sheets for use in geomembrane and other applications.

BACKGROUND OF THE INVENTION

It is known that linear low density polyethylene (LLDPE) when treated with peroxide has an improved transparency for use in making thin polyethylene films. Furthermore, peroxide treated LLDPE can be used to make finished objects such as film under operating conditions used for the conversion of high pressure polyethylene while still maintaining the excellent mechanical properties of LLDPE such as: greater rigidity at equal density; superior hot mechanical strength; improved resistance to cracking under tension; less jamming when tubular film is being produced; and better stretchability and improved resistance to perforation in film form.

Specifically, a process is known for improving melt strength of LLDPE by pretreating the polymer in melt form at a temperature of at least 230° C. in the presence of an organic peroxide for a period of time equal to at least three times the half-life of the organic peroxide at the melt temperature. Such a treatment improves bubble stability in blown film extrusion.

It is also known that processing characteristics of LLDPE may be improved by adding a chemically modified ethylene polymer to a base resin. The use of the modified polymer appears to improve the melt strength of the overall blend, providing greater bubble stability when blowing films from such blends.

As stated above, peroxide treated LLDPE is known to be effective when used for the fabrication of thin films. Such thin films are used to manufacture various products, especially products used in conventional food wrapping and packaging, such as grocery sacks, plastic bags, bread bags and trash bags. In all of these applications, the material manufactured from the peroxide treated LLDPE is a very thin, flimsy material.

Polyethylene is also used to fabricate thicker materials which have quite different applications than food or trash packaging. One polyethylene application which has assumed increased importance in recent years is its use for geomembranes. These are the sheets of material used to line areas of land where toxic waste is stored, leachate ponds, municipal landfills, and other such types of land containment areas. Conventionally, the bottoms and sides of these land areas are lined with high density polyethylene (HDPE) sheets having a thickness of 40–100 milliinches (mils). The material produced is strong, non-biodegradable, impermeable to air and moisture, and is effective as a barrier against leakage of the toxic waste, household chemicals and other such liquids into the soil and drinking water. However, when such material is used to cover the top of such an area, it is too rigid and lacks the capacity to stretch and form a leak-proof barrier around the top of the often irregularly shaped material underneath.

Pure LLDPE has not been used as a material for geomembrane applications because previous attempts to fabricate materials of the thickness necessary for such applications (i.e., in the range of 30–100 mils) have been unsuccessful. Attempts to extrude either blown or cast (flat) LLDPE sheet material at such a thickness range have been unsuccessful because the material simply will not hold together during processing.

A material has been needed for geomembrane applications which could be formed into thick sheets which would be strong, non-biodegradable, impermeable to air and moisture, but which would also have the capacity to stretch and change shape in order to provide an effective covering for a toxic waste storage area, leachate ponds, municipal landfills, and other such land containment areas.

The present invention provides such a material made from peroxide-treated LLDPE material formed to the specifications needed to provide cover and liners for geomembrane lined land areas where which toxic waste and household chemicals are dumped, slurry ponds, and other land containment applications. The present inventors has also successfully overcome previous failures to extrude in either cast or blown sheet from LLDPE materials having a thickness in the range of 30 to 100 mils.

SUMMARY OF THE INVENTION

One object of the present invention is to provide a peroxide modified LLDPE material having a thickness of from 0.030 to 0.100 inches.

Another object of the present invention is to provide a peroxide modified LLDPE material having an axi-symmetric strain at failure of from 50 to 130%.

Still another object of the present invention is to provide a peroxide modified LLDPE material having a stress at rupture (break) of from 600 to 5000 psi.

Another object of the present invention is to provide a peroxide modified LLDPE material having a percent elongation at rupture (break) of from 30 to 1000%.

Yet another object of the present invention is to provide a peroxide-treated LLDPE material made by a method comprising the steps of:

(a) mechanically compounding linear low density resin with a solid or liquid form of peroxide in a co-rotating twin screw extruder to make a peroxidetreated resin; and (b) extruding the peroxide-treated resin as a blown sheet either smooth or textured.

Still another method of the present invention is to provide a method of using linear low density polyethylene resin to make a geomembrane liner comprising the steps of:

(a) mechanically compounding linear low density resin with a solid or liquid form of peroxide in a co-rotating twin screw extruder to make a peroxide-treated resin; and (b) extruding the peroxide-treated resin as a cast or flat sheet either smooth or textured.

Yet another object of the invention is to provide a method of treating linear low density polyethylene (LLDPE) resin with peroxide for use as a geomembrane film comprising mechanically compounding linear low density resin with a solid or liquid form of peroxide in a co-rotating twin screw extruder to make a peroxide treated resin.

DETAILED DESCRIPTION OF THE INVENTION

This invention relates to a material comprising peroxide treated LLDPE. When peroxide treated LLDPE is extruded in the form of a sheet having a thickness in the range of from 30 to 100 milliinches, a material results which has qualities of flexibility, strength and non-biodegradability which are ideal for use as a geomembrane liner material for lining and covering land areas of toxic waste sites, municipal landfills, leachate ponds, and other such land containment areas. The following non-limiting examples describe the conditions under which several embodiments of peroxide treated LLDPE resin and geomembrane materials were made.

EXAMPLES

Example 1

13,923 pounds of peroxide treated LLDPE type pellets are obtained by placing 50-pound batches of conmix (polyethylene pellets) (7109Z) in a blender/extruder (Extruder No. 58MM) with 284 grams Zinc Oxide, 711 grams Irgafos 168, 142 grams Lupersol 101 (peroxide), and 711 grams Irganox 1010. Mixing time in the blender is 30 minutes. Temperatures in the extruder are kept within the range of from 400 to 500° F. Extruder speed is 318 rpms at a production rate of 300 lb/hr. Gear pump suction is 300 psi. Melt index for the peroxide treated pellets is measured intermittently throughout the mixing process to assure that the melt index is maintained in the range of from 0.25 to 0.55 gm/10 min. The peroxide treated LLPDE pellets obtained have a melt index in the range of from 0.39 to 0.41 gm/10 min., an HLMI in the range of from 20–21 gm/10 min., a melt flow ratio in the range of from 50 to 54, a density of 0.921 gm/cc, and an oxidative induction time in the range of from 87 to 120 minutes.

Example 2

Figure 1:
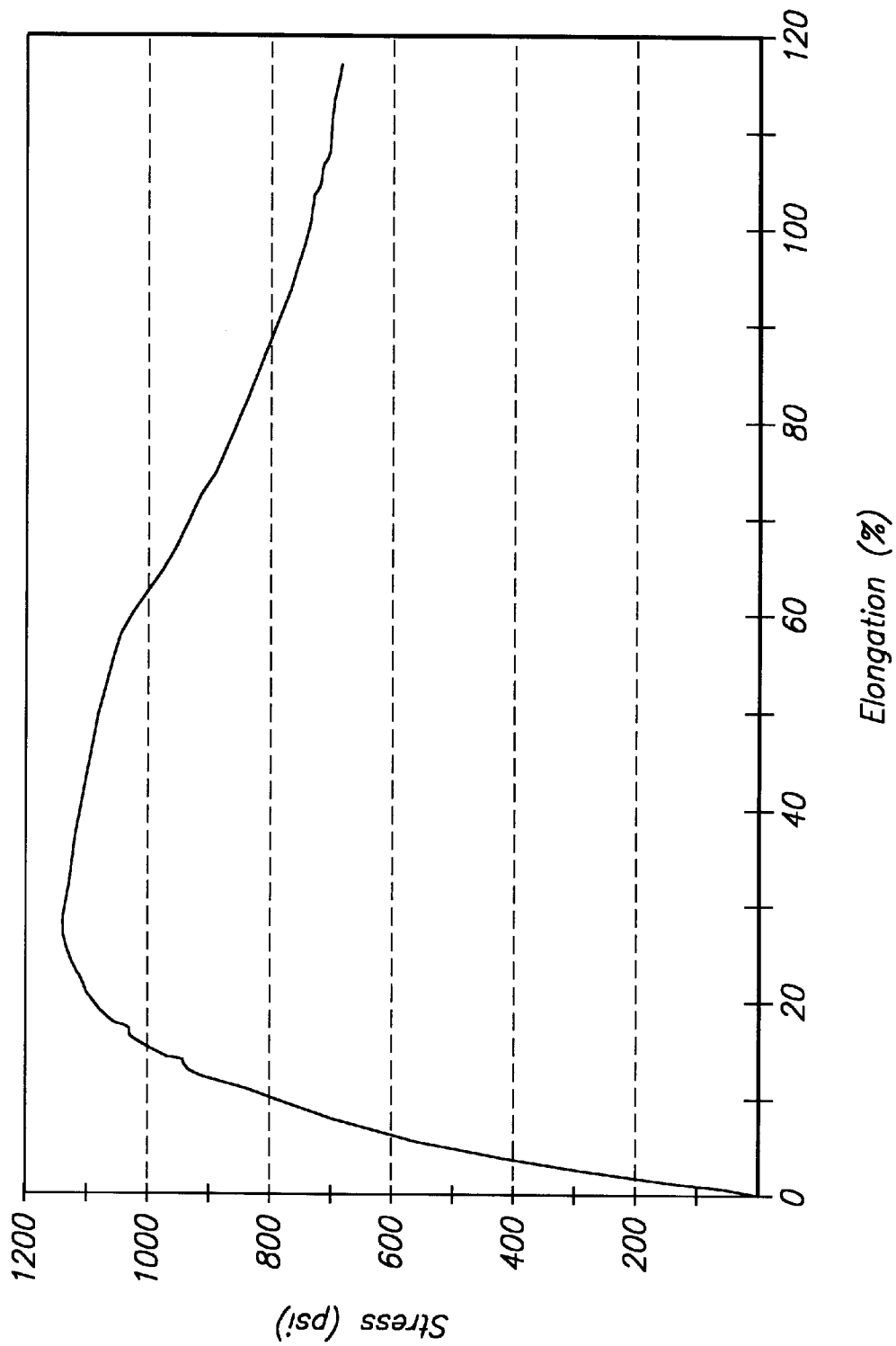
FIG. 1 is a graph plotting the stress (psi) against the elongation (%) for a smooth, non-impled, geomembrane sheet sample.

The peroxide treated LLDPE pellets (ER2257) of Example 1 are used to manufacture, by conventional sheet extrusion methods, sample sheets of geomembrane material having a thickness in the range from 0.040 to 0.043 inches. Thickness of the test specimens was measured in accordance with ASTM D5199. Axi-symmetric tensile testing was performed using a 24" diameter pressure vessel. Pressure was ramped at 1 psi per minute. System pressure was monitored via a pressure transducer and self adjusted every 5 seconds to maintain the pressure ramp. Center region deformation was monitored using a sonar transducer. Data was acquired via a computer monitoring system that collected both pressure and displacement data every 1 second. Samples were of a smooth (non-dimpled) variety. Axi-symmetric tensile properties (ASTM D 5617) of various of these samples were tested. Stress at yield was in a range of from 1119 to 1208 psi. Percent elongation at yield was in a range of from 12.5 to 27.4%. Stress at rupture was in a range of from 676 to 1017 psi. Percent elongation at rupture was from 35.7 to 116%. For each sample, the ruptures in the material as a result of the testing were multi-directional tears. Furthermore, the ruptures were sufficiently far enough away from the edge of the device to assume that the device itself did not lead to the rupture in the material. FIG. 1 plots the stress (psi) against the elongation (%) for a smooth (non-dimpled) geomembrane sheet sample (864–8001).

Example 3

Two shipments (7108 and 7105) of non-peroxide-treated LLDPE resin are prepared under slightly different conditions than the shipment (ER2257) described in Examples 1 and 2. The LLDPE resin pellets were prepared with at least one of the following criteria differing from ER2257. The differing resin criteria include: Melt Index (Ml) (gm/10 min, ASTM D1238 Condition E), High Load Melt Index (HLMI)(gm/10 min., ASTM D1238 Condition F), and Melt Flow Ratio (MFR). Table 1 tabulates the comparative qualities of the peroxide treated LLPDE resin of the three shipments as well as the comparative qualities of geomembrane materials manufactured from the three resin shipments.

TABLE 1

| Property | 7108 | 7105 | ER2257 |
| --- | --- | --- | --- |
| Density, gm/cc | 0.92 | 0.92 | 0.921 |
| Melt Index, gm/10 min. | 0.8 | 0.5 | 0.4 |
| HLMI, gm/10 min. | 26 | 14 | 20 |
| MFR | 33 | 28 | 50 |
| Ash Content, ppm | 770 | 450 | 700 |
| Oxidative Induction Time (OIT), min. | >100 | >100 | 87–115 |
| Environmental Stress Crack Resistance (ESCR) FO hours, 10% Igepal, 50° C. | >6050 | >6050 | |
| Tensile Properties - Resin | | | |
| Tensile at Yield, psi | 2,840 | 2,850 | 2,800 |
| Tensile at Break, psi | 1,260 | 4,760 | 5,250 |
| Elongation, % | 800 | 790 | 810 |
| Tensile Properties-Sheet | | | |
| Thickness | 50 mils | | 40 mils |
| Test Rate | | | 2'/min |
| Elongation at Break, % | 790 | | 685 |
| Tear, lbs | 31 | | 25–27 |
| Puncture, lbs | | | 89 |
| Multi-Axial % Elongation | | | 72–116 |
| Avg. Tensile Force at Break, cN | 1.7 | 1.8 | 2.1 |
| Avg. Elongation Ratio | 17.3 | 6.6 | 6.3 |
| Molecular Weight Data | | | |
| Mn | 41,270 | 43,260 | 40,300 |
| Mw | 124,680 | 134,160 | 122,080 |
| Mz | 336,380 | 352,350 | 312,700 |
| Mw/Mn | 3.02 | 3.08 | 3.03 |

Figure 2:
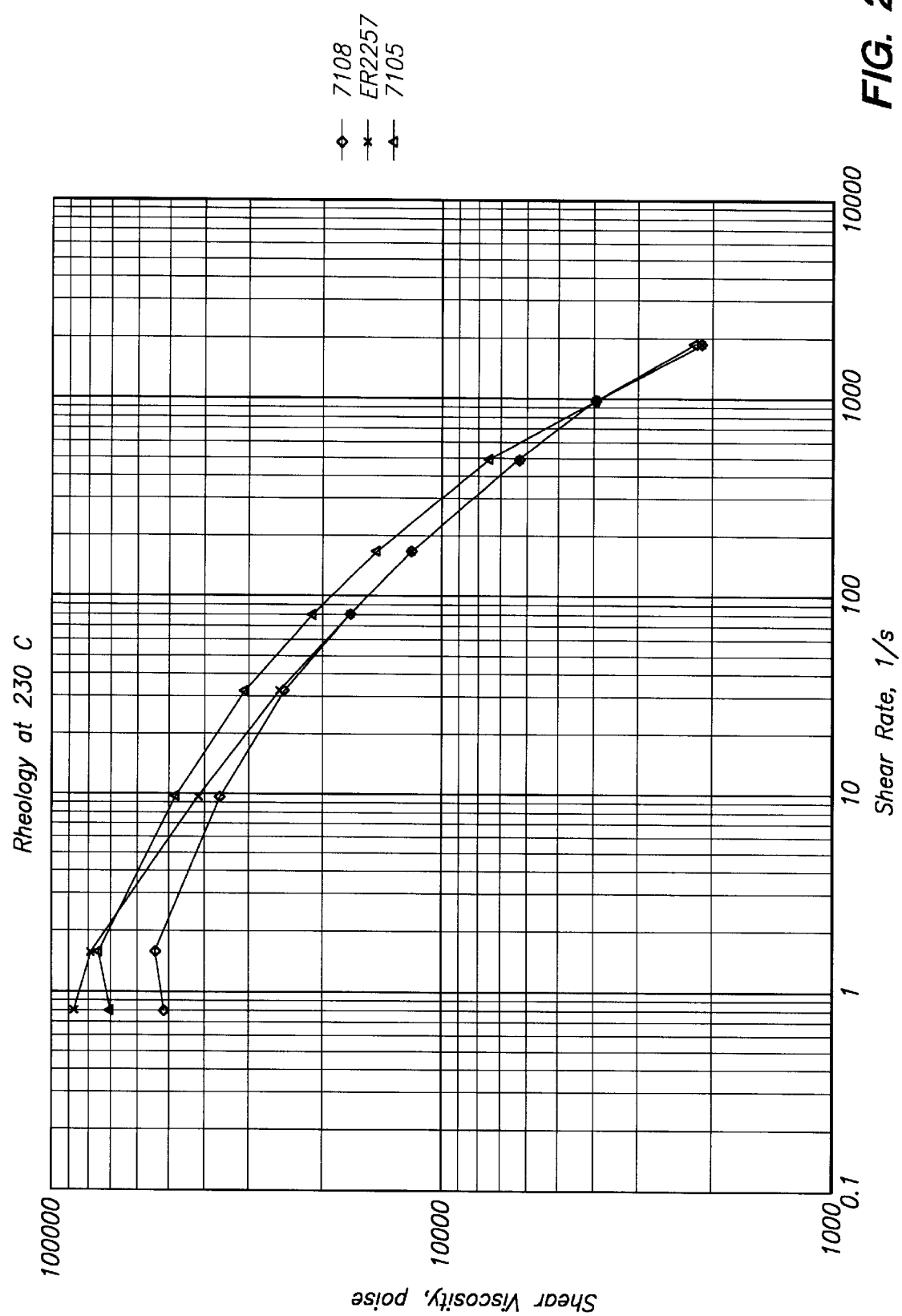
FIG. 2 is a graph plotting the shear viscosity (poise) of 7105, 7108 and ER2257 against the shear rate (1/s) at 230° C.
Figure 3:
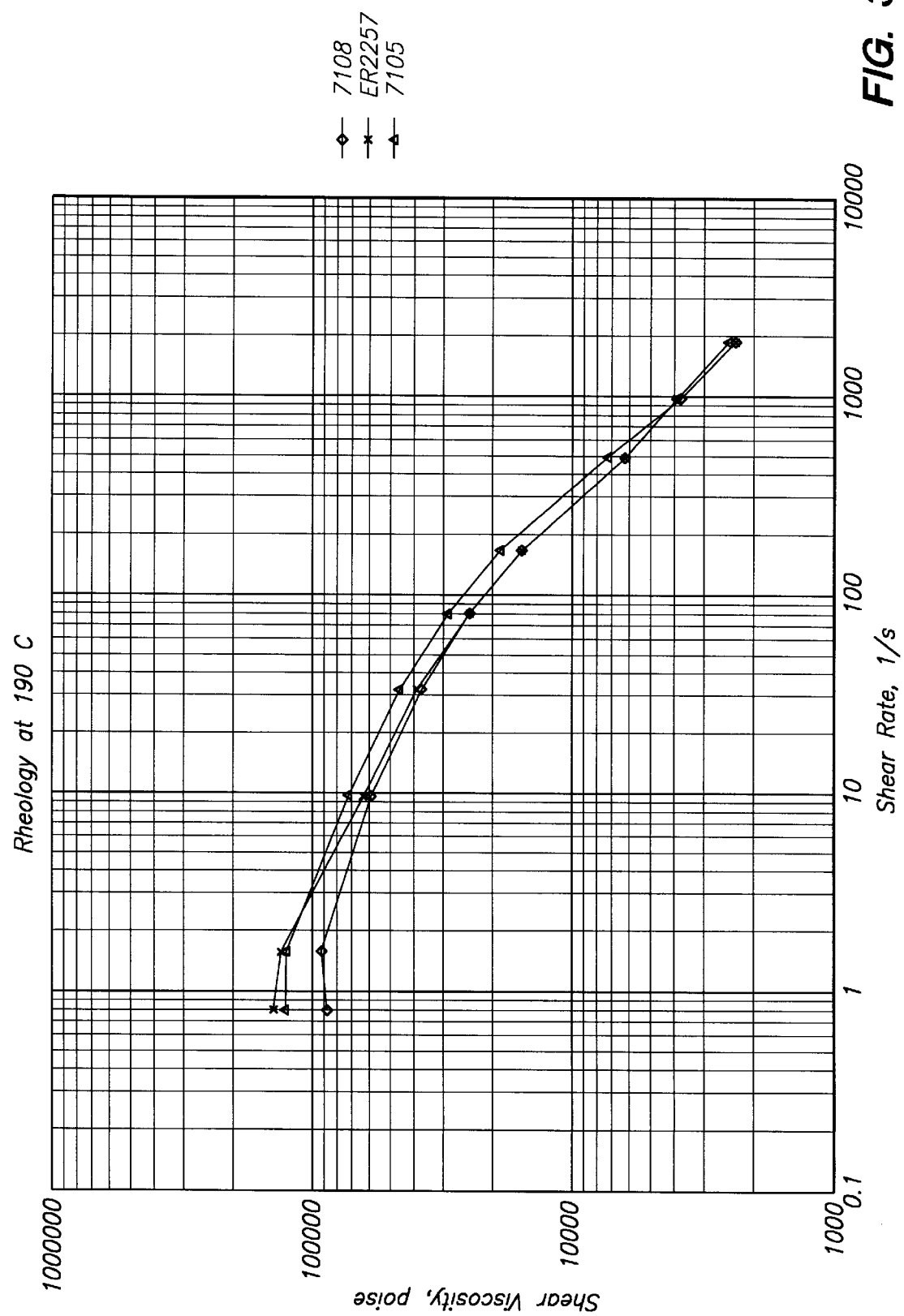
FIG. 3 is a graph plotting the shear viscosity (poise) of 7105, 7108 and ER2257 against the shear rate (1/s) at 190° C.

FIG. 2 is a graph plotting the shear viscosity (poise) of 7105, 7108 and ER2257 against the shear rate (1/s) at 230° C. FIG. 3 is a graph plotting the shear viscosity (poise) of 7105, 7108 and ER2257 against the shear rate (1/s) at 190° C.

Example 4

ER3212 was produced on commercial scale production equipment under conditions similar to ER 2257 as described in Example 1.

Table 2 contains resin physical property data for ER3212, a peroxide treated LLDPE resin similar to ER2257.

TABLE 2

ER 3212 Resin Data

| Property | G078367 | G078369 | G078370 | G078374 | G078378 | G078382 | G078385 | G078389 | G078396 | G048720 | G048726 |
|---|---|---|---|---|---|---|---|---|---|---|---|
| Density, gm/cc | 0.9200 | 0.9205 | 0.9207 | 0.9208 | 0.9207 | 0.9207 | 0.9205 | 0.9203 | 0.9194 | 0.9198 | 0.9201 |
| Melt Index, gm/10 min. | 0.36 | 0.35 | 0.36 | 0.38 | 0.38 | 0.40 | 0.43 | 0.45 | 0.45 | 0.33 | 0.34 |
| HLMI, gm/10 min. | 15.5 | 15.1 | 15.5 | 15.8 | 18.7 | 15.8 | 17.6 | 17.9 | 18.7 | 12.9 | 13.7 |
| MFR | 43.1 | 43.1 | 43.1 | 41.6 | 49.2 | 39.5 | 40.9 | 39.8 | 41.6 | 39.1 | 40.3 |
| Initial Tension @ 190° C. | 5.0 | 4.3 | 5.0 | 5.3 | 4.4 | 4.5 | 4.5 | 3.4 | 3.5 | 6.1 | 5.8 |
| Initial Tension @ 230° C. | 3.4 | 2.8 | 3.5 | 3.5 | 3.5 | 3.0 | 2.7 | 3.4 | 2.4 | 3.6 | 3.4 |
| Vicat Softening Temp, ° C. | 105 | 104 | 106 | 107 | | 105 | 105 | 104 | 106 | | |
| C-13 NMR Butyl Branches | 15.5 | 16.4 | 16.2 | 13.8 | 13.6 | 13.1 | 14.0 | 16.0 | 18.7 | | |
| Additive AB, ppm | 625 | 555 | 580 | 580 | 580 | 585 | 600 | 575 | 600 | 590 | 595 |
| Additive VIII, ppm | 1305 | 1290 | 1395 | 1320 | 1290 | 1470 | 1450 | 1390 | 1400 | 1180 | 1255 |
| Additive XVI, ppm | 1610 | 1500 | 1545 | 1505 | 1585 | 1455 | 1620 | 1555 | 1665 | 1615 | 1535 |
| GPC Data | | | | | | | | | | | |
| Mn | 39,400 | 39,500 | 40,300 | 39.900 | 39,300 | 39,400 | 39,300 | 38,900 | 38,600 | 43,100 | 43,060 |
| Mw | 133,170 | 131,820 | 133,990 | 131,950 | 130,780 | 130,760 | 129,560 | 128,030 | 127,420 | 137,100 | 134,050 |
| Mz | 362,840 | 354,290 | 363,180 | 353,030 | 348,710 | 347,200 | 344,510 | 343,000 | 341,140 | 353,480 | 342,710 |
| Mw/Mn | 3.38 | 3.33 | 3.33 | 3.31 | 3.32 | 3.32 | 3.3 | 3.29 | 3.3 | 3.18 | 3.11 |
| Flexural Modulus, psi | | | | | | | | | | 48,650 | 48,065 |
| Tensile Properties, (20 in/min testing) | | | | | | | | | | | |
| Strength at Yield, psi | | | | | | | | | | 1,560 | 1,700 |
| Strength at Break, psi | | | | | | | | | | 4,400 | 4,530 |
| Elongation, % | | | | | | | | | | 740 | 750 |
| Tensile Properties, (2 in/min testing) | | | | | | | | | | | |
| Strength at Yield, psi | 1620 | 1640 | 1620 | 1690 | 1650 | 1650 | 1620 | 1620 | 1590 | | |
| Strength at Break, psi | 4390 | 4600 | 4330 | 4480 | 4590 | 4480 | 4620 | 4220 | 4610 | | |
| Elongation, % | 770 | 780 | 790 | 780 | 770 | 790 | 780 | 750 | 780 | | |
| OIT, minutes | 130 | 125 | 125 | 120 | 125 | 140 | | 130 | 145 | 145 | 130 |
| NCTL, hrs. | | | | | | >530 | | | | >1483 | >1460 |

Example 5

The ER3212 resin was used to produce geomembrane sheets under conditions similar to those described in Example 2.

Table 3 contains sheet data for geomembrane produced from ER3212. Both smooth sheet and textured sheet data are shown. Axi-symmetric data for strain at failure ranged from 55 to 125%. The sheet thicknesses ranged from 40 to 69 mils. Tensile strength at break ranged from 2869 to 4918 psi. Elongation at break ranged from 495 to 950%.

Figure 4:
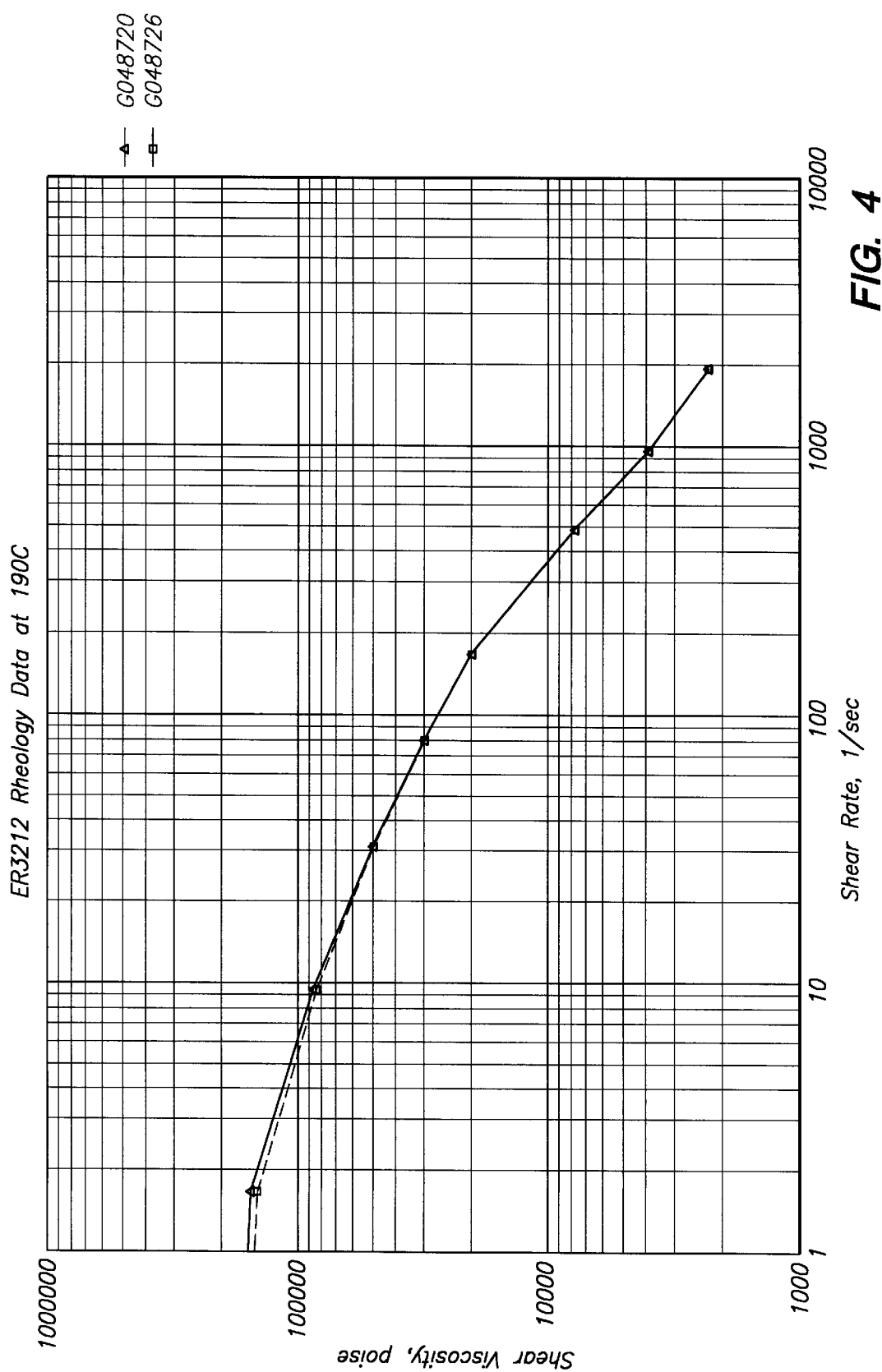
FIG. 4 is a graph plotting the shear viscosity (poise) of ER3212 against the shear rate (1/s) at 190° C.
Figure 5:
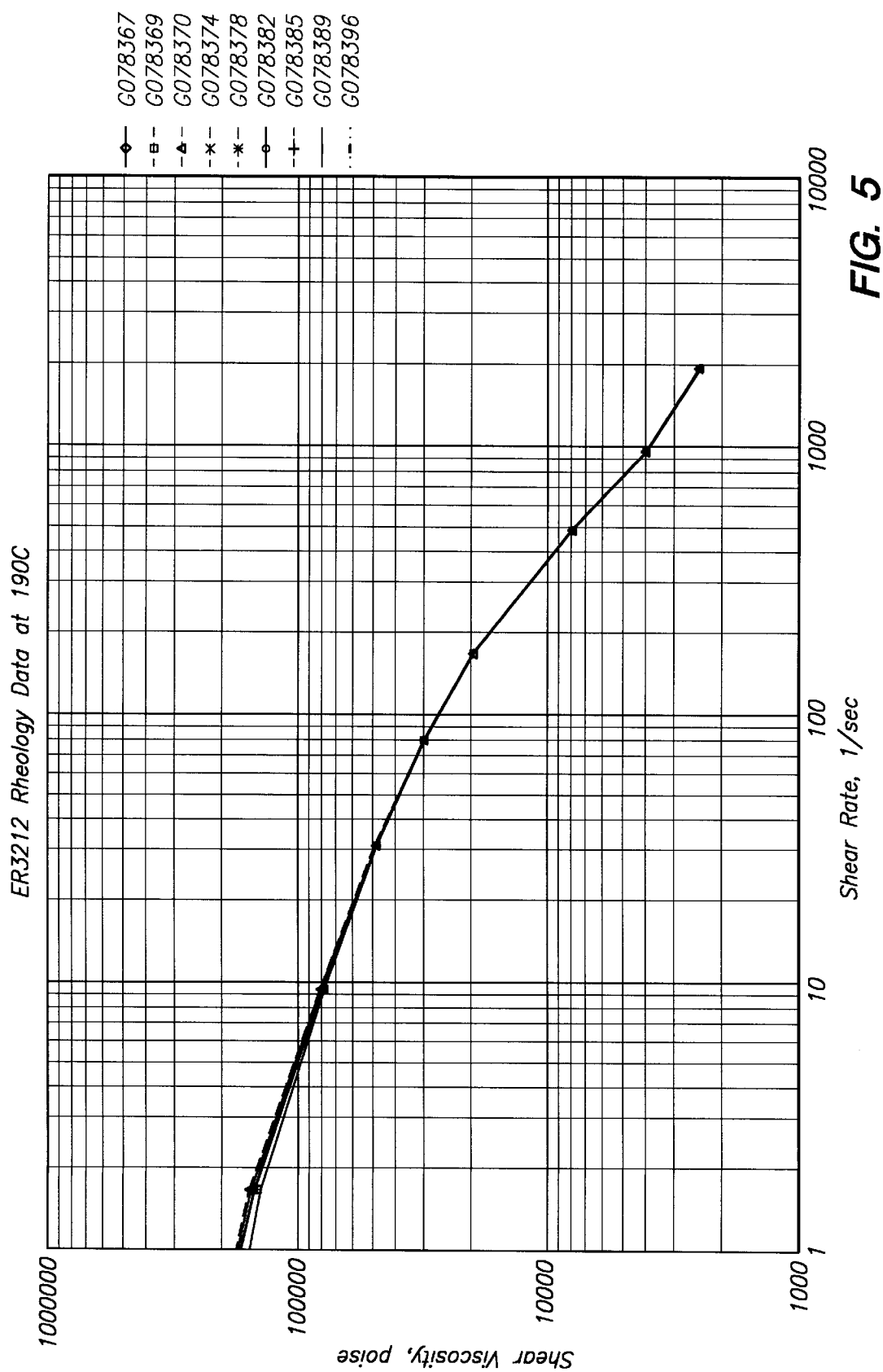
FIG. 5 is a graph plotting the shear viscosity (poise) of ER3212 against the shear rate (1/s) at 230° C.

FIGS. 4 and 5 are graphs plotting shear viscosity (poise) of ER3212 against the shear rate (1/s) at 190° C.

TABLE 3

ER 3212 Sheet Data

| Property | ER 3212 Smooth | ER 3212 Textured | ER 3212 Smooth | ER 3212 Textured |
|---|---|---|---|---|
| Process | Cast | Blown | Blown | Blown |
| Density, gm/cc | | 0.929 | 0.930 | 0.930 |
| Carbon Black Content, % | | 2.3 | | |

TABLE 3-continued

ER 3212 Sheet Data

| Property | ER 3212 Smooth | ER 3212 Textured | ER 3212 Smooth | ER 3212 Textured |
|---|---|---|---|---|
| Axi-Symmetric Data | | | | |
| Strain at Failure, % | 125 | 55 | 130 | 75 |
| Puncture Resistance, psi MD | 2310 | 1385 | 1963 | 1705 |
| Tensile @ Yield, psi | 1510 | 1660 | | |
| Elong @ Yield, % | 25 | 19 | | |
| Tensile @ Break, psi | 4590 | 3660 | 4918 | 3379 |
| Elong @ Break, % | 630 | 535 | 947 | 655 |
| Sample Thickness, mils | 49 | 69 | 40 | 40 |
| Tear Resistance, psi TD | 610 | 665 | 616 | 629 |
| Tensile @ Yield, psi | 1540 | 1660 | | |
| Elong @ Yield, % | 21 | 19 | | |

TABLE 3-continued

ER 3212 Sheet Data

| Property | ER 3212 Smooth | ER 3212 Textured | ER 3212 Smooth | ER 3212 Textured |
|---|---|---|---|---|
| Tensile @ Break, psi | 4530 | 3280 | 4902 | 2869 |
| Elong @ Break, % | 915 | 495 | 950 | 568 |
| Sample Thickness, mils | 50 | 69 | 40 | 40 |
| Tear Resistance, psi | 590 | 660 | 566 | 617 |

Although a few embodiments of the invention have been described in detail above, it will be appreciated by those skilled in the art that various modifications and alterations can be made to the particular embodiments shown without materially departing from the novel teachings and advantages of the invention. Accordingly, it is to be understood that all such modifications and alterations are included within the spirit and scope of the invention as defined by the following claims.

What is claimed is:

1. A geomembrane liner comprising a peroxide modified LLDPE sheet having a thickness of from 0.03 inches to 0.100 inches wherein the sheet is characterized by an axi-symmetric strain at failure of from 50% to 130%, a stress at rupture of from 600psi to 5000psi, and a percent elongation at rupture (break) of from 30% to 1000%.

2. The geomembrane of claim 1 made by a method comprising the steps of:

(a) mechanically compounding LLPDE resin with a solid or liquid form of peroxide in a co-rotating twin screw extruder to make a peroxide treated resin; and (b) extruding the peroxide-treated resin as a blown sheet either smooth or textured.

3. The geomembrane of claim 2 wherein the solid form of the peroxide comprises at least 55 weight percent $CaCo_2/SiO_2$.

4. The geomembrane of claim 2 wherein the peroxide-treated resin comprises 100–500 ppm peroxide.

5. The geomembran of claim 2 wherein the peroxide-treated resin has a melt index from approximately 0.55 gm/10 min.

* * * * *